US007263561B1

(12) United States Patent
Green et al.

(10) Patent No.: US 7,263,561 B1
(45) Date of Patent: *Aug. 28, 2007

(54) SYSTEMS AND METHODS FOR MAKING ELECTRONIC FILES THAT HAVE BEEN CONVERTED TO A SAFE FORMAT AVAILABLE FOR VIEWING BY AN INTENDED RECIPIENT

(75) Inventors: Jeffrey Green, Aylesbury (GB); Paul N Gartside, Woughton-on-the-Green (GB); Chris Bolin, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 825 days.

This patent is subject to a terminal disclaimer.

(21) Appl. No.: 09/935,635

(22) Filed: Aug. 24, 2001

(51) Int. Cl.
*G06F 15/16* (2006.01)
*G06F 12/16* (2006.01)

(52) U.S. Cl. ............... 709/246; 709/206; 726/24

(58) Field of Classification Search ........... 709/206, 709/232, 246; 715/500; 370/546; 345/418; 382/181, 232, 276, 325; 710/1, 33; 726/24
See application file for complete search history.

(56) References Cited

U.S. PATENT DOCUMENTS

| | | | | |
|---|---|---|---|---|
| 5,832,208 A * | 11/1998 | Chen et al. ............ | 713/201 |
| 5,889,943 A * | 3/1999 | Ji et al. ................ | 726/22 |
| 5,956,481 A * | 9/1999 | Walsh et al. ........... | 726/23 |
| 5,960,170 A * | 9/1999 | Chen et al. ............ | 713/200 |
| 6,092,114 A * | 7/2000 | Shaffer et al. ......... | 709/232 |
| 6,108,799 A * | 8/2000 | Boulay et al. ......... | 714/38 |
| 6,336,124 B1 * | 1/2002 | Alam et al. ........... | 715/523 |
| 6,411,685 B1 * | 6/2002 | O'Neal ................. | 379/88.14 |
| 6,549,208 B2 * | 4/2003 | Maloney et al. ....... | 345/473 |
| 6,571,245 B2 * | 5/2003 | Huang et al. .......... | 707/10 |
| 6,684,329 B1 * | 1/2004 | Epstein et al. ........ | 713/150 |
| 6,785,732 B1 * | 8/2004 | Bates et al. ........... | 709/232 |
| 6,901,519 B1 * | 5/2005 | Stewart et al. ........ | 726/24 |
| 2002/0004908 A1 * | 1/2002 | Galea .................. | 713/200 |
| 2002/0029350 A1 * | 3/2002 | Cooper et al. ........ | 713/200 |
| 2002/0033844 A1 * | 3/2002 | Levy et al. ............ | 345/744 |
| 2002/0091697 A1 * | 7/2002 | Huang et al. .......... | 707/10 |
| 2002/0091776 A1 * | 7/2002 | Nolan et al. .......... | 709/206 |
| 2002/0120693 A1 * | 8/2002 | Rudd et al. ........... | 709/206 |
| 2002/0178381 A1 * | 11/2002 | Lee et al. .............. | 713/201 |
| 2003/0097361 A1 * | 5/2003 | Huang et al. .......... | 707/10 |
| 2003/0126214 A1 * | 7/2003 | Oliszewski ........... | 709/206 |
| 2003/0195950 A1 * | 10/2003 | Huang et al. .......... | 709/219 |

OTHER PUBLICATIONS

Omura, J. K. "Novel Application of Cryptography in Digital Communications", IEEE, Communication Magazine, vol. 28, Issue: 5, May 1990, pp. 21-29.*

(Continued)

*Primary Examiner*—George C. Neurauter, Jr.
(74) *Attorney, Agent, or Firm*—Zilka-Kotab, PC; Christopher J. Hamaty

(57) ABSTRACT

System and methods of converting electronic files infected with a computer virus from a first format to a second, safe format and then making the converted electronic file available for viewing by the intended recipient.

41 Claims, 2 Drawing Sheets

OTHER PUBLICATIONS

Telecomworldwide. "Symantec provides virus protection service for Yahoo! Mail", May 18, 2000, 1 page.*

"Outside In Viewer Technologies", http://www.intranetsolutions.com/products/developer_viewer.html May 2001, p. 1, IntraNet Solutions, Inc.

"Outside In Viewer Technology. Developer Technology Fact Sheet, Industry Leading Viewing Capabilities For Desktop Application Developers", Business Content Management, May 2001, pp. 1-2, IntraNet Solutions.

"Outside In Viewer Technology Specifications, Supported Platforms and File Formats", Business Content Management, May 2001, pp. 1-2, IntraNet Solutions.

"Outside In Content Access, Developer Technology Fact Sheet, Unparalleled Access To Information Stored In Unstructured Business Content", May 2001, pp. 1-2, IntraNet Solutions.

"Outside In Viewer Technology, Developer Technology Fact Sheet, Leading Viewing Technology For Mobile And Wireless Environments", May 2001, pp. 1-2, IntraNet Solutions.

"Outside In Content Access Specifications, Supported Platforms and File Formats", Business Content Management, May 2001, pp. 1-7, IntraNet Solutions.

"GroupShield Exchange For Microsoft Exchange 2000, Administrator's Guide", Jan. 2001, pp. 1-271, Version 4.5, Network Associates Technology, Inc.

Office Action Summary from U.S. Appl. No. 09/935,634, which was mailed on Mar. 7, 2005.

Office Action Summary from U.S. Appl. No. 09/935,634, which was mailed on Apr. 29, 2005.

Office Action Summary from U.S. Appl. No. 09/935,634, which was mailed on Nov. 15, 2004.

Office Action Summary from U.S. Appl. No. 09/935,634, which was mailed on Aug. 19, 2005.

Advisory Action from U.S. Appl. No. 09/935,634, which was mailed on Jan. 17, 2006.

* cited by examiner

SYSTEMS AND METHODS FOR MAKING ELECTRONIC FILES THAT HAVE BEEN CONVERTED TO A SAFE FORMAT AVAILABLE FOR VIEWING BY AN INTENDED RECIPIENT

BACKGROUND

1. Field of the Invention

The present invention relates generally to the handling of electronic files infected with a computer virus and, more particularly, to systems and methods for converting infected electronic files to a safe format.

2. Discussion of the Related Art

Computer viruses present a significant threat to the integrity and reliability of computer systems, especially as more computers on different networks communicate with one another via electronic mail and other electronic communication avenues. Anti-virus software has thus become an important part in the effective maintenance of computer systems.

Many conventional anti-virus programs scan incoming electronic mail for viruses, which are often embedded in an attachment to electronic mail. If the anti-virus software detects a virus in the attachment of the electronic mail, the software will attempt to disinfect or clean the file by removing the virus. To ensure that the intended recipient of the electronic mail can open and view the cleansed file, anti-virus programs retain the format of the infected file such that the file is still associated with and may be opened with the same application. For example, if the infected attachment is a Microsoft Word format file having a macro-virus amongst safe macros, the cleansed file is still a Microsoft Word format file having the safe macros.

To ensure comprehensive virus protection, users of many anti-virus software packages are encouraged to periodically receive updates of new virus remedies that permit the software to identify and disinfect files infected with new viruses. If a user does not have an update for a new virus or an update does not yet exist for the new virus, the anti-virus software may not detect the virus such that it problematically passes through the anti-virus software and infects the recipient's computer and possibly other users on the recipient's system or network. This is one of the more persistent problems associated with conventional anti-virus software packages. To combat this problem, some anti-virus programs attempt to detect potential new viruses with a heuristic scan, which is essentially a search for files that behave like viruses. While heuristic scans may identify potential viruses, they often produce false alarms when a clean file behaves as a virus might. If a heuristic scan identifies a new virus, it is most likely that the anti-virus software cannot disinfect the file. In this instance, the anti-virus software typically quarantines or deletes the infected attachment and forwards the e-mail message to the intended recipient. The recipient can read the e-mail message but not the infected attachment, which is typically replaced with a notice advising the recipient that the original attachment was infected. Hence, the recipient cannot view the attachment, which often frustrates the recipient—especially in instances where the infected attachment is necessary to complete an urgent task. Despite the risks associated with opening infected files, many recipients would rather risk opening infected files than forego the opportunity to view the contents of the files.

SUMMARY OF THE INVENTION

In light of the foregoing problems, embodiments of the present invention strive to provide a system and method that prevents new computer viruses associated with an electronic file from infecting the computer of an intended recipient of the electronic file, even for those viruses for which virus remedies are not available. Additionally, embodiments of the present invention strive to provide a system and method by which an intended recipient can view the contents of an infected electronic file without infecting the computer of the intended recipient.

Other advantages and features associated with the present invention will become more readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

DETAILED DESCRIPTION OF THE PREFERRED EMBODIMENTS

Figure 1:
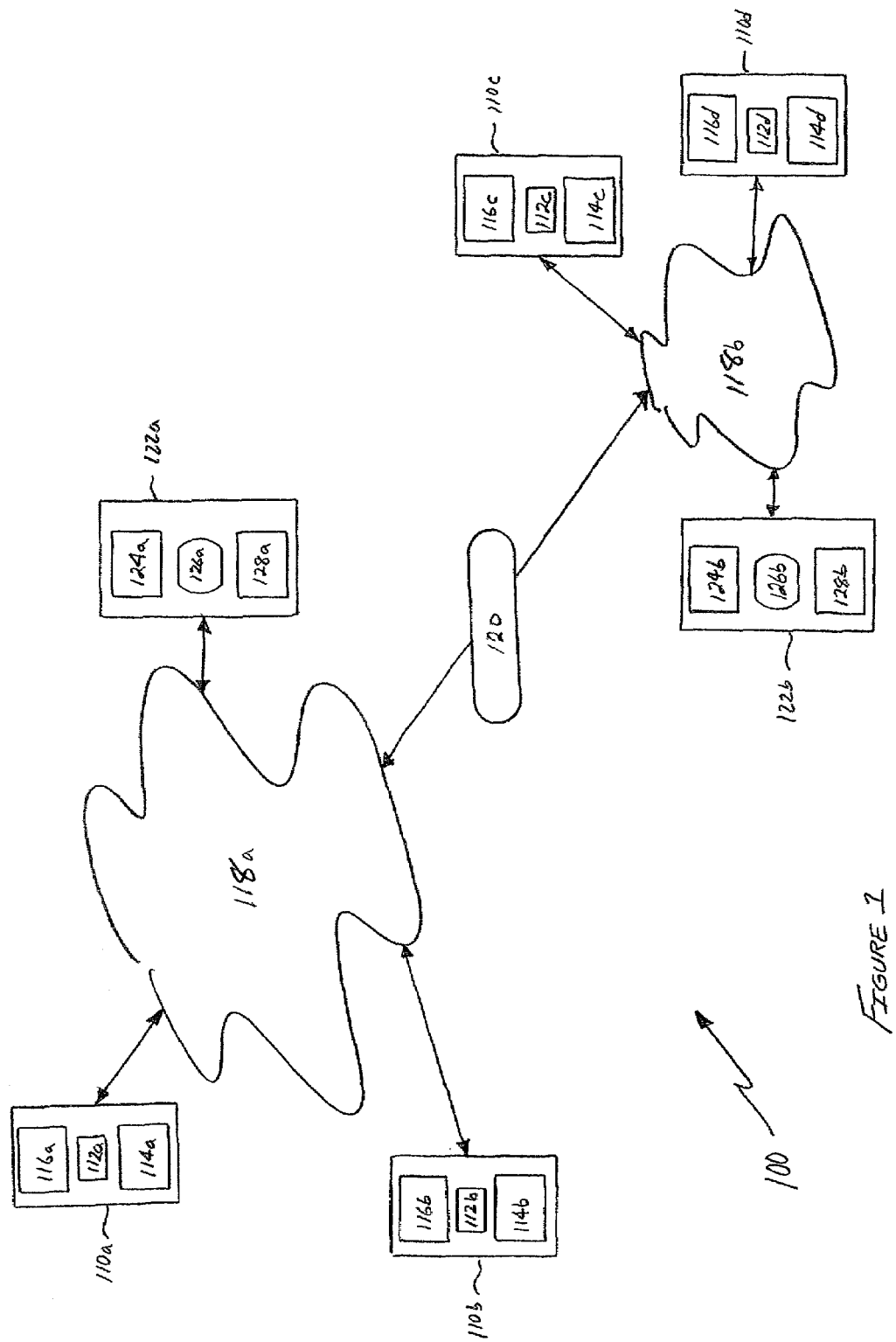
FIG. 1 is a schematic of a network in accordance with one embodiment of the present invention.
Figure 2:
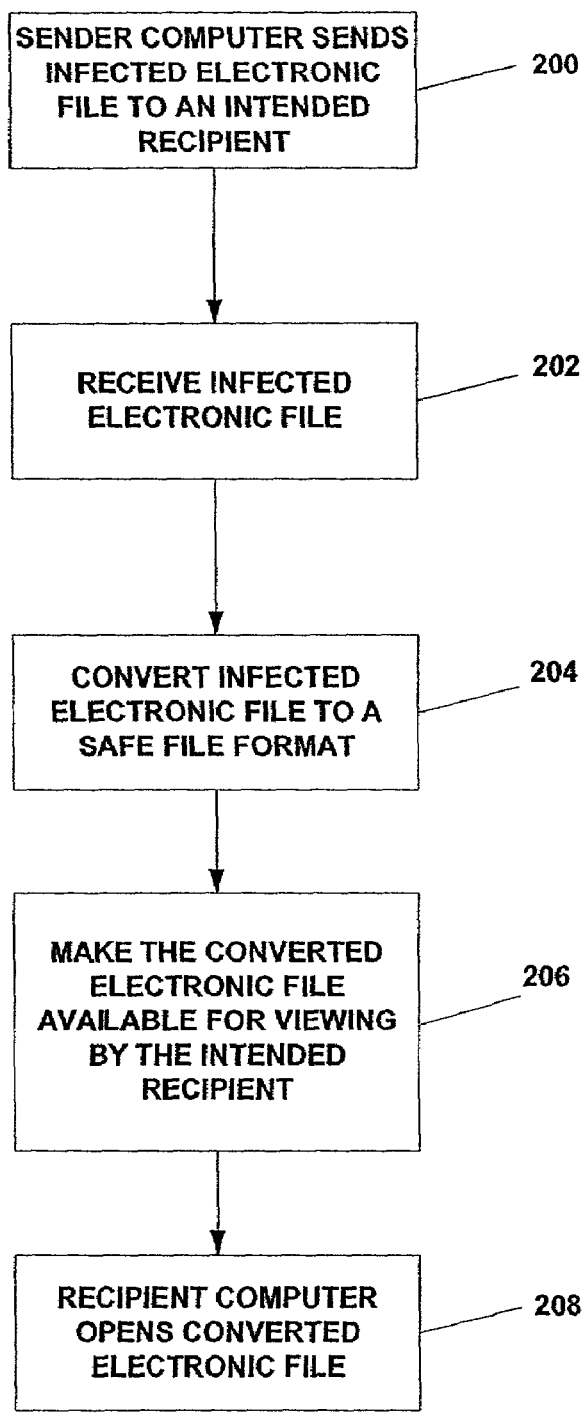
FIG. 2 is a flow diagram illustrating one embodiment of a method of the present invention.

The entire disclosure of U.S. application Ser. No. 09/935,634, entitled "Systems and Methods for Making Electronic Files That Have Been Converted to a Safe Format Available for Viewing by an Intended Recipient," filed on Aug. 24, 2001, is here by incorporated by reference. FIG. 1 illustrates a network 100 that may be operated in accordance with one embodiment of the present invention, and FIG. 2 illustrates a flow chart of an exemplary method of the present invention. As illustrated in FIG. 1, the network 100 includes a first network 118a connected to a second network 118b, and a plurality of computers 110a, 110b, 110c, 110d that send and receive electronic files to and from each other. The computers 110a and 110b reside on the first network 118a, while the computers 110c and 110d reside on the second network 118b. The first network 118a enables communication amongst the computers 110a, 110b and a server computer 122a, and the second network 118b enables communication amongst the computers 110c, 110d, a server computer 122b, and a gateway computer 120. The networks 118a, 118b include any wired or wireless transmission channels having any number of servers, computers, routers, switches, bridges, etc, and may also include one or more interconnecting networks.

The computers 110a, 110b, 110c, 110d are devices such as desktop computers, laptop computers, workstations, telephones, wireless phones, personal digital assistants ("PDA's"), servers, pagers, and other wireless or hardwired electronic communication devices. The computers 110a, 110b, 110c, 110d each include a central processing unit ("CPU") 112a, 112b, 112c, 112d connected to a memory (primary and/or secondary) 114a, 114b, 114c, 114d that stores one or more computer programs for carrying out the operations described below, such as the communication of electronic files between the respective computers 110a, 110b, 110c, 110d. As is known, the computer programs of the computers 110a, 110b, 110c, 110d are used to communicate with server computers 122a, 122b and to visually present the information received from such computers. The computers 110a, 110b, 110c, 110d each establish network communication through a standard network connection device 116a, 116b, 116c, 116d, such as a wired or wireless network connection card.

As is illustrated in FIG. 1, the gateway 120 separates the second network 118b from the first network 118a. The gateway 120 is a computer that selectively accepts and blocks information that is transmitted to and from the second network 118b. As will be appreciated, the gateway 120 can include various forms of firewall-type functionality.

The server computers 122a, 122b each include standard server computer components, including a network connection device 124a, 124b, a CPU 126a, 126b, and a memory structure 128a, 128b. The memories 128a, 128b each store one or more computer programs that implement standard communication between the computers 110a, 110b, 110c, 110d of the network 100. The server computer 122b of the second network 118b is connected to the computers 110c, 110d and executes programs for carrying out various functions, including e-mail communication between the computer 110c and the computer 110d within the second network 118b, as well as e-mail communication between the computers 110c, 110d and the computers 110a, 110b of the first network 118a. In the illustrated embodiment, the memory 126b of the server computer 122b stores one or more programs to implement processing associated with one embodiment of the present invention. The operation of one embodiment of the invention is now described with reference to FIG. 2.

FIG. 2 illustrates a flowchart of one embodiment of a method in accordance with the present invention. When a user ("sender") of the computer 110a ("sender computer") desires to send an electronic file to a user ("intended recipient") of the computer 110d ("recipient computer"), the sender, at a step 200, sends the electronic file to the intended recipient via standard electronic communication vehicles such as e-mail. For example, the sender may create an e-mail message with software resident on the sender computer 110a or the server computer 122a and then attach the electronic file to the e-mail message. The sender addresses the e-mail message to the address of the recipient computer 110d and at step 200, sends, i.e. forwards, the e-mail message and the attached electronic file to the recipient computer 110d over the network 100. For purposes of illustration, the electronic file sent by the sender is infected with a computer virus.

A computer virus is a sequence of commands or instructions that interfere with a user's operation of, or cause damage to, a computer system, such as the user's computer 110d, the server computer 122b, or other computers on the user's network 118b. Computer viruses may damage a computer system directly, such as by deleting files or formatting a disk, or indirectly, such as by altering the computer system's protective measures and thus making the computer system vulnerable to probing or other attacks. Most computer viruses are computer program files that are capable of attaching to electronic files and causing damage to the file itself, other files, programs of the computer system on which the infected file is located, or programs and files of computers that communicate with the infected computer system. Some viruses replicate, some sit in a computer's memory and infect files as the computer opens, modifies or creates files. Some viruses damage files and computer systems without the user noticing the damage. While virus creators once focused on binary executable computer files, such as those with a ".EXE" or a ".COM" file extension, they now target other types of files, such as batch files and script files that contain instructions that are executed in conjunction with binary executable programs. For example, computer viruses are often found in the macros, i.e. scripts, of Microsoft Word files, in Windows Batch files (.BAT), and in Visual Basic Script files (.VSB), which are all typically text files having instructions or commands that are executed by a computer without user interaction.

As will be appreciated, an infected electronic file sent by a sender may be any file format that is capable of carrying a computer virus. Electronic files that are capable of carrying an executable virus include word processing files, spreadsheet files, database files, graphics files, presentation files, compressed or encoded files, and binary executable files. For example, a virus may be carried by an electronic file having one of the following word processing file format types: ANSI; ASCII; Corel WordPerfect; DEC WPS Plus; DisplayWrite; Enable; First Choice; IMB FFT; Legacy; Lotus WordPro; RTF (with scripts); Microsoft Word; Novell; Office Writer; WordStar; etc. A virus may also be carried by an electronic file having one of the following spreadsheet file format types: Enable; First Choice; Lotus 1-2-3; Microsoft Excel; Microsoft Multiplan, Microsoft Works; QuattroPro; SmartWare; etc. A virus may be carried by an electronic file having one of the following database file format types: Access; dBase; DBXL; Enable; FoxBase; Framework; Microsoft Works; Paradox; R:Base; Reflex; Smartware; etc. A virus may be carried by an electronic file having one of the following graphics file format types: AI; CDR; DCR; DSF; DWG; CGM; CMX; DCX; DRW; DXF; EMF; EPS; FMV; FPX; GDF; GEM; GP4; HPGL; IGES; IMG; JFIF; MET; PBM; PCD; PCX Bitmap; PDF; Perfect Works; PGM; PIC; PIF; PNG; PNTG; PPM; PS; PSD; PSP; RND; SDW; Snapshot; SRS; Targa; TIFF; VISO; WMF; WPG; XBM; XPM; XWD, etc. A virus may be carried by an electronic file having one of the following presentation file format types: Corell; Novell; Harvard Graphics; Freelance; PowerPoint; etc. A virus may be carried by an electronic file having one of the following compressed or encoded file format types: ARJ; ARC; BZIP; GZIP; LZA; LZH; Microsoft Binder; MIME; Neolite; UUEncode; UNIX Compress; UNIX TAR; ZIP; etc. A virus may also be carried by an electronic file having one of the following other formats: EXE; DLL; MSG; VSB; SVR; BAT; COM; SYS; DRV; BIN; OVL; OVY; etc.

In the illustrated embodiment, the e-mail message originates at sender computer 110a on first network 118a. The e-mail message is processed by one or more mail servers and forwarded to second network 118b. Prior to entering second network 118b, the e-mail message is processed by the gateway computer 120. If the gateway computer 120 permits the e-mail message to enter into the second network 118b, the e-mail message is then forwarded to the server computer 122b, which functions as an internal mail server. At a step 202, the server computer 122b receives the e-mail message and the electronic file.

In accordance with one embodiment of the present invention, after the server computer 122b has received the e-mail message and attached electronic file, the server computer 122b then accesses a program stored in the memory 128b or another location, which, when executed by the server computer at a step 204, converts the received electronic file to a safe file format. The safe file format is a file format that is different from the file format of the infected electronic file received by the server computer 122b and that prevents the virus of the received electronic file from executing when, at steps 206 and 208, the converted electronic file is made available for viewing by the intended recipient and eventually opened by the recipient computer 110d. The safe file format type prevents the computer virus from executing when the converted electronic file is opened by the intended recipient because the conversion to the safe file format either removes the computer virus from the electronic file or renders the virus inoperable. This ensures that the computer virus is unable to harm the intended recipient's computer or other items of the network 100 when the converted electronic file is opened by the intended recipient.

Safe file formats that prevent the virus of the infected electronic file from executing include pure text file formats that do not include scripts, as well as other file formats that render the virus inoperable or removes viruses during the converting process. For example, in one embodiment, received electronic files that are in a word processing file format are converted to a pure text format that does not include scripts, such as a TXT file format, a RTF file format (without embedded objects), or a HTML file format (without scripts). Any computer viruses are either removed or rendered inoperable when the converted electronic file is ultimately opened with a word processing application of the recipient computer 110*d*. In other examples, received electronic files that are in a spreadsheet file format are converted to a HTML file format or a CSV file format. Received electronic files that are in a database file format are converted to a HTML file format. Received electronic files that are in a graphics file format are converted to a JPB, a BMP, a JPEG, a HTML, or a GIF file format, and received electronic files that are in a presentation file format are converted to a JPB, a GIF, a BMP, a JPEG, or a HTML file format. Other file formats that prevent viruses from executing include ASCII file formats. As will be appreciated, the above and other file formats are considered to be safe format file types because these file format types prevent computer virus from executing when the converted electronic file is opened by the intended recipient because the computer virus is either removed or rendered inoperable.

Considering a specific example, if the electronic file received by the server computer 122*b* is a Microsoft Word, Excel, or Access format file, the electronic file may include macros. Macros are script instructions designed to simplify repetitive tasks within a program, such as Microsoft Word, Excel, or Access, and are executed by a program when the user opens the associated electronic file. Unfortunately, macro viruses may be written in the macro programming language and attached to the electronic file. When an electronic file containing a macro virus is opened in the target application in the conventional manner, the virus is executed, typically does damage and often copies itself into other files. In accordance with one embodiment of the present invention, the server computer 122*b* will convert a received Word format file having a macro virus therein into a pure text file format that does not include macros, such as a HTML file format (without scripts), a RTF file format (without embedded objects), or a TXT file format prior to the recipient computer 110*d* receiving the electronic file. In this example of the conversion process, the received electronic file is read into the memory 128*b*, and any formatting characteristics in the received electronic file are then removed. The converted file is defined by then writing out the file in the memory and replacing it with the file from which the formatting characteristics have been removed. As will be appreciated, this conversion process could execute for the entire file in the memory or successive portions of the file. In addition, the removed formatting could be replaced with appropriate new formatting to retain the original appearance of the infected file.

A number of commercially available software products include computer executable code suitable for converting received electronic files into one of the aforementioned safe formats. For example, the computer executable software code that converts the received electronic file in accordance with the present invention may be similar to the code resident in and executed by many commercially available word processing programs, spreadsheet programs, graphic programs, and presentation programs when a user converts a file from one format to another format in response to a "SAVE AS" command. More particularly, exemplary code would include that associated with saving a file having a .DOC extension to a .TXT extension, or the code associated with saving a file having a .VS extension to a .BMP extension. Additionally, the computer executable software code that converts the infected electronic file in accordance with the present invention may be similar to the code executed by many commercially available viewer programs, such as Quick View Plus (commercially available through IntraNet Solutions, Inc., Eden Prairie, Minn., USA), which permits users to view different format files with one application.

After the electronic file has been converted to the safe format, the server computer 122*b*, at step 206, makes the converted electronic file available for viewing by the intended recipient, after which, at step 208, the recipient opens and views the converted electronic file with one or more applications resident on the computer 110*d* or the server computer 122*b*. Because the electronic file has been converted to the aforementioned safe format, a virus associated with the electronic file is prevented from executing and infecting the computer system of the intended recipient. Hence, the intended recipient can view the contents of the electronic file without executing the virus. Additionally, because the conversion process prevents the virus from infecting the recipient computer 110*d*, the second network 118*b* need not include a virus remedy to detect and clean the virus from the received electronic file.

In accordance with embodiments of the present invention, the converted electronic file may be made available for viewing by the intended recipient in a variety of manners. For example, in accordance with one embodiment, the converted electronic file is forwarded to the recipient computer 110*d* via a the original e-mail message to the intended recipient. That is, the electronic file received by the server computer 122*b* is replaced with the converted electronic file and then sent to the recipient computer 110*d*, where at step 208 the intended recipient may view the converted electronic file by opening the converted electronic file with an appropriate application.

In accordance with another embodiment, the server computer 122*b* makes the converted electronic file available for viewing by the intended recipient by first determining whether the received electronic file represents a potential security risk in one of the manners described below. If it is determined that the received electronic file represents a potential security risk, then a notification is sent to the intended recipient, where the notification indicates that the electronic file represents a potential security risk. If the intended recipient desires to view the content of the received electronic file, the intended recipient forwards a request to the server computer 122*b* indicating that the intended recipient desires to view the contents of the electronic file. In response to this request, the server computer 122*b* forwards the converted electronic file to the recipient computer 110*d*, where the intended recipient can open and view the converted electronic file. As is apparent, in this embodiment, the server computer 122*b* may convert the received electronic file before receiving the request from the intended recipient or in response to receiving the request. The server computer 122*b* may also convert the electronic file before determining whether the received electronic file represents a potential security risk or in response to a determination that the received electronic file represents a potential security risk.

In another embodiment, the converted electronic file is made available for viewing by the intended recipient by storing the converted electronic file at a location on the memory 128*b*, the memory 114*d*, or another memory, where the memory location is accessible by the intended recipient. As will be appreciated, the memory location may be a specific file, a directory, or a database on one or more storage mediums, such as a hard drive. For example, the converted electronic file may be stored in memory of the server 122*b* that is shared by the computers 110*c*, 110*d*. In another example, the converted electronic file may be stored in a memory of the server 122*b* that is only allocated for the recipient computer 110*d*. Alternatively, the server computer 122*b* may store the converted electronic file in the memory of the recipient computer 110*d*. Furthermore, the converted electronic file may be stored in a quarantine store (a memory location allocated for electronic files that contain or might contain a virus) in which only an administrator has unlimited access and in which the intended recipient only has access to converted electronic files originally addressed to the intended recipient. In each of these examples, the intended recipient may access the memory location where the converted electronic file is stored such that the intended recipient can retrieve and open the converted electronic file from the memory. In accordance with one embodiment, the server computer 122*b* forwards an e-mail message to the intended recipient that identifies the memory location where the converted electronic file is located. For example, the server computer 122*b* may forward an email message identifying a shared memory location on the memory 128*b* of the server. Alternatively, the server computer may forward an e-mail message to the intended recipient that includes a uniform resource locator ("URL") that identifies the memory location where the converted electronic file is located, such as the address of a web page containing the converted electronic file. To open and view the converted electronic file, the intended recipient accesses the web page via a web browser application. The server computer 122*b* may convert the electronic file before the intended recipient clicks the URL, or in response to the user clicking the URL.

In a typical application of the invention, the server computer 122*b* will receive multiple electronic mails addressed to different recipient computers on the network 118*b* and each having an attached electronic file that may contain a virus. In accordance with one embodiment of the method illustrated in FIG. 2, the server computer 122*b* will convert each received electronic file to one or more of the aforementioned safe formats regardless of the content of each electronic file. That is, the computer executable code is configured such that every incoming message is converted to the safe format even though the incoming electronic file may or may not be infected with a computer virus. In this manner every received electronic file is converted to a safe format and forwarded by the server computer 122*b* to the appropriate recipient computer such that the recipient can safely view the electronic file. Hence, in this embodiment, the network 118*b* need not include or need not implement specific features of virus protection software that is capable of detecting and cleaning one or more specific viruses. In this and other embodiments of the present invention, the server computer 122*b* may include code configured to recognize or detect different received file format types, and to then choose one or more appropriate safe file formats that the received files will be converted to. For example, if the server computer 122*b* receives a first file having a word processing file format type and a second file having a graphics file format type, the server computer 122*b* will determine that the first file having the word processing file format will be converted to a TXT file format, a RTF file format (without scripts), or a HTML file format and that the second file having the graphics file format will be converted to a JPB file format, a BMP file format, a JPEG file format, a GIF file format, or a HTML file format. In an alternative embodiment, the code is configured such that the server computer 122*b* only converts those received electronic files having one or more particular file formats, such as the above-identified file format types that may support a potential computer virus. For example, the server computer 122*b* may examine the retrieved electronic files and only convert those electronic files that do not have the following safe format types: TXT file format; RTF file format (without embedded objects); BMP file format; JPEG file format; CSV file format; JPB file format; GIF file format; HTML file format (without scripts); and ASCII file format. In accordance with the above embodiments, the code recognizes the file format type of the received electronic files by examining the file extension of the electronic files or by other techniques. In a further embodiment, the code is configured such that the server computer 122*b* converts every received electronic file, regardless of format, to one safe format, such as a HTML file format. Hence, the server computer 122*b* need not examine the file format type of the received electronic files.

In a further embodiment of the method illustrated in FIG. 2, the computer executable software code executed by the server computer 122*b* is configured to, after step 202 and before step 204, determine whether the received electronic file represents a potential risk to a computer system, such as the recipient computer 110*d*, other computers on the network 118*b*, the server 122*b*, or other components of the network 118*b*. For example, the server computer 122*b* may determine whether an electronic file represents a potential security risk to security by attempting to detect computer viruses in received electronic files. Hence, in this embodiment the memory 128*b* of the server computer 122*b* contains a virus detection program and virus signature files. Virus signatures are sequences of computer readable characters that portray viruses found within textual and/or executable computer files in that they match the behavior exhibited by, or a series of characters found within, known viruses. The virus detection program includes computer-readable instructions which, when executed by the CPU 126*b*, search for viruses within received electronic files. Viruses in these received electronic files are identified by the detection of characteristics that match one of the virus signatures stored in the memory 128*b*. The virus detection program operates by opening the received electronic file and searching for at least one virus signature. VirusScan and GroupShield Exchange, both produced by Network Associates, Inc., are two efficacious programs for searching electronic files for virus signatures. As is known, the primary routine used by these anti-virus applications is "SCAN.EXE". In general, the program SCAN.EXE operates by comparing the contents of a received electronic file with at least one known virus signature to determine if there is a match. In accordance with one embodiment of the present invention, the server computer 122*b* will first scan an incoming electronic file, such as one attached to an e-mail message addressed to the recipient computer 110*d*, for viruses before converting the electronic file to the aforementioned safe format. If it is determined that the incoming electronic file does not contain a computer virus, the server computer 122*b* will forward the e-mail message and the attached electronic file to the recipient computer 110d. However, if the server computer 122b determines that the electronic file contains a computer virus, the infected electronic file is stored in a quarantine store, eventually converted at step 204 to the safe format, and at step 206 the converted electronic file is then made available for viewing by the intended recipient in one or more of the aforementioned manners.

In another embodiment, if the server computer 122b detects a virus in the received electronic file, the server computer will attempt to disinfect or clean the file in the conventional manner by removing the virus. However, if the server computer 122b cannot disinfect the infected electronic file, the server computer will then convert the infected electronic file to the safe format and then make the converted electronic file available for viewing by the intended recipient.

In an additional embodiment, the server computer 122b determines whether the received electronic file represents a potential security risk by detecting potential viruses with a conventional heuristic scan in which the server computer 122b determines whether the contents of the electronic file reflect or behave like a potential computer virus.

In a further embodiment, the server computer 122b determines whether an electronic file represents a potential security risk by determining whether the electronic file has a file extension indicative of a file type that supports a potential computer virus, such as those identified above.

In one embodiment of the invention, the methodology illustrated in FIG. 2 and alternative methodology described above is incorporated into a conventional virus detection program, such as Virus Scan and Group Shield Exchange, via which an administrator of the program can set settings that trigger the conversion of electronic files to the safe format in response to any of the criteria set forth or other criteria as will be apparent.

The computer executable program code that receives an electronic file intended for delivery from the sender to the intended recipient and that converts the infected electronic file to the safe format may be stored and executed at other locations on the network 100. For example, in accordance with one embodiment of the invention, the computer executable code is located on the memory 114d of the recipient computer 110d. In this embodiment, the recipient computer 110d will execute the program code such that the electronic file received by the recipient computer is converted to the safe format before the user opens the electronic file and causes possible damage to the recipient computer 110d. In a further embodiment of the present invention, the computer executable code may be located on a memory of the gateway computer 120. In this embodiment, the gateway computer 120 will execute the program code such that the electronic file received by the gateway computer is converted to the safe format before the intended recipient has the opportunity to open the infected electronic file. As will also be appreciated, the computer executable program code may be stored and executed at any number of different and multiple locations on the network 100, such as the server 122a. Portions of or the entirety of the computer executable program code may also be distributed through a computer data signal embodied in a transmission medium of the network 100.

Although the foregoing embodiments of the invention have been described in reference to an infected electronic file attached to an e-mail message, it will be appreciated that the invention is applicable to other types of infected electronic files that are intended for delivery from a sender to a recipient. For example, in one embodiment of the invention, electronic files received by HTTP, FTP, or another file transfer protocol are converted to a safe file format before the file is made available for viewing by the intended recipient. In a further example, the network 100 is internet based and communications thereon occur in accordance with web-browser and web page data that is transmitted by a server on the network 100. Users of the computers 110a, 110b, 110c, 110d communicate with each other on the network 100 via an Internet "chat room". Within a chat room, a user at one computer types messages that are received and displayed on the screen of the other users in the same chat room. Users can come and go from connections, establish periodic communication, etc. Such chat rooms are typically implemented by Internet relay chat programs, such as mIRC, which when executed automatically invoke a number of script files to perform various functions. Unfortunately, a computer virus, such as the mIRC virus, may be in the scripts of the chat room messages. In accordance with one embodiment of the invention, computer executable code on a user computer, on a server, or at another location will receive messages to be displayed on the chat room board and convert each message to a safe file format such as HTML (without scripts) before displaying the message to the recipients into the chat room. Because the messages are converted to the safe format, any script viruses are prevented from infecting the recipient of the chat room message.

In accordance with past technology, if a virus was detected in a received electronic file and the file could not be cleansed, the intended recipient could not view the contents of the file without attempting to open the infected files. Hence, many recipients would take the risk of opening infected files in instances where the infected files were necessary to complete an urgent task. Because the embodiments of the present invention convert infected electronic files to a safe format, computer viruses are advantageously prevented from executing such that the intended recipient can safely view the contents of infected electronic files, regardless of whether or not a virus remedy is available to disinfect the infected files or whether or not the virus was detected with a heuristic scan.

The principles, preferred embodiments, and modes of operation of the present invention have been described in the foregoing description. However, the invention that is intended to be protected is not to be construed as limited to the particular embodiments disclosed. Further, the embodiments described herein are to be regarded as illustrative rather than restrictive. Others may make variations and changes, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A method carried out by a computer when executing computer-readable program code, the method comprising:
   receiving an electronic file intended for delivery from a sender to an intended recipient, the electronic file having a first file format with a first file extension;
   determining whether the electronic file represents at least a potential security risk to a computer system;
   when it is determined that the electronic file represents at least the potential security risk, then forwarding to the intended recipient a notification indicating that the electronic file represents at least the potential security risk;

receiving from the intended recipient a request to view the contents of the electronic file;

converting the electronic file from the first file format with the first file extension to a second file format with a second file extension that is different from the first file format with the first file extension and that prevents a computer virus in the electronic file from executing when the converted electronic file is opened by the intended recipient, said converting of the electronic file being in response to a determination that the electronic file represents at least the potential security risk to the computer system; and making the converted electronic file available for viewing by the intended recipient.

2. The method of claim 1, said converting occurring in response to said receiving the request to view the contents of the electronic file.

3. The method of claim 1, said converting occurring prior to said receiving the request to view the contents of the electronic file.

4. A method carried out by a computer when executing computer-readable program code, the method comprising:

receiving an electronic file intended for delivery from a sender to an intended recipient, the electronic file having a first file format with a first file extension;

converting the electronic file from the first file format with the first file extension to a second file format with a second file extension that is different from the first file format with the first file extension and that ensures that a computer virus in the electronic file is unable to harm a computer of the intended recipient, said converting of the electronic file being in response to a determination that the electronic file represents at least a potential security risk to the computer; and forwarding a uniform resource locator to the intended recipient of the electronic file, the uniform resource locator identifying at least an address of a web page containing the converted electronic file.

5. The method of claim 4, the second file format being a HTML file format without scripts.

6. A method carried out by a computer when executing computer-readable program code, the method comprising:

receiving a certain electronic file intended for delivery from a sender to an intended recipient, the electronic file having a first file format with a first file extension;

converting the certain electronic file from the first file format with the first file extension to a second file format with a second file extension that is different from the first file format with the first file extension and that prevents a computer virus in the certain electronic file from executing when the converted electronic file is opened by the intended recipient, said converting of the electronic file being in response to a determination that the electronic file represents at least a potential risk to the computer; and making the converted electronic file available for viewing by the intended recipient.

7. The method of claim 6, said making the converted electronic file available for viewing comprising:

forwarding a uniform resource locator to the intended recipient of the electronic file, the uniform resource locator identifying at least an address of a web page containing the converted electronic file.

8. The method of claim 6, said making the converted electronic file available for viewing comprising:

forwarding the converted electronic file to a computer of the intended recipient.

9. The method of claim 6, said making the converted electronic file available for viewing comprising:

saving the converted electronic file in a memory that is accessible by the intended recipient.

10. The method of claim 6, said determining whether the certain electronic file represents the potential risk comprising:

determining if the certain electronic file contains the computer virus.

11. The method of claim 6, said determining whether the certain electronic file represents the potential risk comprising:

conducting a heuristic scan of the certain electronic file.

12. The method of claim 6, the certain electronic file being an attachment to an electronic mail sent over a network.

13. The method of claim 12, the network including the internet.

14. The method of claim 6, said receiving occurring at a desktop computer of the intended recipient.

15. The method of claim 6, said receiving occurring at a server computer.

16. The method of claim 6, said receiving occurring at a gateway computer.

17. The method of claim 6, said converting occurring at a desktop computer of the intended recipient.

18. The method of claim 6, said converting occurring at a server computer.

19. The method of claim 6, said converting occurring at a gateway computer.

20. The method of claim 6, the certain electronic file being a first electronic file, further comprising:

receiving a second electronic file intended for delivery from another sender to another intended recipient, the second electronic file having a third file format and containing another computer virus;

converting the second electronic file to a fourth file format that is different from the third file format and that prevents the another computer virus from executing when the converted second electronic file is opened by the another intended recipient; and making the converted second electronic file available for viewing by the another intended recipient.

21. The method of claim 6, the computer virus including a macro virus.

22. The method of claim 6, the second file format being at least one of a TXT file format, a RTF file format without embedded objects, a BMP file format, a JPEG file format, a CSV file format, a JPB file format, a GIF file format, a HTML file format without scripts, and a ASCII file format.

23. The method of claim 22, the second file format being the HTML file format without scripts.

24. The method of claim 22, the second file format being the ACSII file format file.

25. The method of claim 22, the second file format being the TXT file format.

26. The method of claim 6, the second file format being a file format having text without scripts.

27. The method of claim 6, the certain electronic file being at least one of a word processing file, a spreadsheet file, a database file, a graphics file, a presentation file, a compressed file, and a binary executable file.

28. The method of claim 6, further comprising:

determining if the first file format is one of a word processing file format type and a graphics file format type, the second file format being at least one of a safe TXT file format, a safe RTF file format without embedded objects, and a safe HTML file format without scripts if it is determined that the certain file format is the word processing file format type, the second file format being at least one of a safe JPB file format, a safe BMP file format, a safe GIF file format, and a safe JPEG file format if it is determined that the first file format is the graphics file format type.

29. The method of claim 6, the certain electronic file being an electronic file received by at least one of a FTP transfer protocol or a HTTP transfer protocol.

30. A method comprising:
receiving a request to view the contents of an electronic file infected with a computer virus, the electronic file having a first file format with a first file extension; and
in response to the request, converting the electronic file from the first file format with the first file extension to a second file format with a second file extension that is different from the first file format with the first file extension and that prevents the computer virus from executing when the converted electronic file is opened, said converting of the electronic file being in further response to a determination that the electronic file represents at least a potential security risk to a computer.

31. The method of claim 30, in further response to the request, making the converted electronic file available for viewing by an entity that requested to view the contents of the certain electronic file.

32. A computer-readable medium having instructions stored thereon, the instructions when executed by a computer cause the computer to:
convert an electronic file from a first format with a first file extension to a second file format with a second file extension, the electronic file being intended for delivery from a sender to an intended recipient, the second file format with the second file extension being different from the first file format with the first file extension and preventing a computer virus in the electronic file from executing when the converted electronic file is opened by an intended recipient of the electronic file, said converting of the electronic file being in response to a determination that the electronic file represents at least a potential risk to the computer; and
make the converted electronic file available for viewing by the intended recipient.

33. The computer-readable medium of claim 32, the certain electronic file being an attachment to an electronic mail sent over a network.

34. The computer-readable medium of claim 32 said determining whether the certain electronic file represents the potential risk comprising:
determining if the certain electronic file contains the computer virus.

35. The computer-readable medium of claim 32, the instructions when executed by the computer further cause the computer to:
determine if the first file format is one of a word processing file format type and a graphics file format type, the second file format being at least one of a safe TXT file format, a safe RTF file format without embedded objects, and a safe HTML file format without scripts if it is determined that the certain file format is the word processing file format type, the second file format being at least one of a safe JPB file format, a safe BMP file format, a safe GIF file format, and a safe JPEG file format if it is determined that the first file format is the graphics file format type.

36. The computer-readable medium of claim 32, the computer virus being a macro virus.

37. The computer-readable medium of claim 32, the second file format being at least one of a TXT file format, a RTF file format without embedded objects, a BMP file format, a JPEG file format, a CSV file format, a JPB file format, a GIF file format, a HTML file format without scripts, and a ASCII file format.

38. An apparatus comprising:
a computer having means for receiving a certain electronic file intended for delivery from a sender to a intended recipient, the certain electronic file having a first file format with a first file extension and containing a computer virus, the computer further including means for converting the certain electronic file from the first file format with the first file extension to a second file format with a second file extension that is different from the first file format with the first file extension and that prevents the computer virus from executing when the converted electronic file is opened by the intended recipient, said converting of the electronic file being in response to a determination that a electronic file represents at least a potential security risk to the computer, the computer further including means for making the converted electronic file available for viewing by the intended recipient.

39. The apparatus of claim 38, said computer being a desktop computer of the intended recipient.

40. The apparatus of claim 38, said computer being a server computer of a local area network.

41. The apparatus of claim 38, said computer being a gateway computer.

* * * * *